(12) United States Patent
Lin et al.

(10) Patent No.: US 10,606,139 B2
(45) Date of Patent: Mar. 31, 2020

(54) PIXEL STRUCTURE

(71) Applicant: AU Optronics Corporation, Hsin-Chu (TW)

(72) Inventors: Sih-Yan Lin, Hsin-Chu (TW);
Chia-Chun Hsu, Hsin-Chu (TW);
Yu-Zhang Huang, Hsin-Chu (TW);
Yen-Hua Lo, Hsin-Chu (TW);
Hsin-Chun Huang, Hsin-Chu (TW);
Wen-Rei Guo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/263,795

(22) Filed: Jan. 31, 2019

(65) Prior Publication Data

US 2019/0271891 A1 Sep. 5, 2019

(30) Foreign Application Priority Data

Mar. 5, 2018 (TW) .............................. 107107298 A

(51) Int. Cl.
*G02F 1/1362* (2006.01)
*G02F 1/1337* (2006.01)
(Continued)

(52) U.S. Cl.
CPC .... *G02F 1/136286* (2013.01); *G02F 1/13624* (2013.01); *G02F 1/133707* (2013.01); *G02F 1/134309* (2013.01); *G09G 3/36* (2013.01); G02F 2001/13629 (2013.01); G02F 2001/134372 (2013.01);
(Continued)

(58) Field of Classification Search
CPC ......... G02F 1/136286; G02F 1/136227; G02F 1/13629; G02F 1/1365; G02F 1/1368; G02F 1/133707; G02F 1/134309; G02F 1/13624; G02F 2001/134372; G02F 2001/13629; G02F 2201/121; G02F 2201/123; G02F 2201/128; G09G 3/36; G09G 2300/0426; G09G 2300/0439; H01L 27/3244; H01L 27/3246; H01L 27/3262; H01L 27/3276; H01L 27/3279
See application file for complete search history.

(56) References Cited

U.S. PATENT DOCUMENTS 8,289,310 B2 10/2012 Lee et al.
9,500,922 B2 * 11/2016 Jiang ................... G02F 1/13624
(Continued)

*Primary Examiner* — Tom V Sheng
(74) *Attorney, Agent, or Firm* — WPAT, PC

(57) ABSTRACT

A pixel structure includes a substrate, first and second gate lines, first and second data lines, and at least one pixel unit. The first and second gate lines and the first and second data lines are over the substrate and intersect with each other. The pixel unit is disposed on the substrate. The pixel unit includes first and second active devices, a common electrode, and first and second pixel electrodes. The first and second active devices are electrically connected to the first data line, and electrically connected to the first and second gate lines respectively. The common electrode is connected to a common potential source. The first and second pixel electrodes are over the common electrode and electrically connected to the first and second active devices respectively. At least one second branch electrode of the second pixel electrode shrinks from its one side to another side.

20 Claims, 17 Drawing Sheets

(51) Int. Cl.
*G02F 1/1343* (2006.01)
*G09G 3/36* (2006.01)

(52) U.S. Cl.
CPC .. *G02F 2201/121* (2013.01); *G02F 2201/123* (2013.01); *G02F 2201/128* (2013.01); *G09G 2300/0426* (2013.01); *G09G 2300/0439* (2013.01)

(56) References Cited

U.S. PATENT DOCUMENTS

| | | | |
|---|---|---|---|
| 9,673,230 B2* | 6/2017 | Cheng | H01L 27/124 |
| 10,031,363 B2* | 7/2018 | Chen | G02F 1/133345 |
| 10,140,903 B2* | 11/2018 | Lee | G09G 3/3233 |
| 10,297,218 B2* | 5/2019 | Xu | H01L 27/12 |
| 2002/0176030 A1* | 11/2002 | Matsumoto | G02F 1/1345 349/43 |
| 2006/0114394 A1* | 6/2006 | Yamzaki | G02F 1/134336 349/139 |
| 2012/0162157 A1 | 6/2012 | Chuang et al. | |
| 2015/0129984 A1* | 5/2015 | Cheng | H01L 27/124 257/401 |
| 2017/0039975 A1* | 2/2017 | Ito | G02F 1/13306 |
| 2017/0242305 A1* | 8/2017 | Liao | G09G 3/3677 |
| 2018/0267370 A1* | 9/2018 | Chu | G02F 1/134309 |
| 2018/0275473 A1 | 9/2018 | Lo et al. | |

* cited by examiner

PIXEL STRUCTURE

CROSS-REFERENCE TO RELATED APPLICATION

This application claims priority to Taiwan Application Serial Number 107107298, filed Mar. 5, 2018, which is herein incorporated by reference in its entirety.

BACKGROUND

Technical Field

The present disclosure relates to a pixel structure.

Description of Related Art

Virtual Reality (VR) is a technology that uses computer technology to generate images and construct virtual space. By using VR glasses, a display is near to a user's eyes, and images are projected to the eyes in a short distance through optical designs, thereby providing visual experiences for the user.

Some VR skills use smart devices (e.g., smart phone) as medium device, and enable users to easily experience funs of VR through the smart devices by carrying multifunction in one machine with low cost. Compared to ordinary typical display device, a VR display has fewer requirements with respect to wide viewing angle and high brightness, but has more requirements with respect to fast response speed. As a result, it is important to meet the requirements of the typical display and the VR display by using one single display device.

SUMMARY

According to some embodiments of the present disclosure, a pixel structure is provided. The pixel structure has first branch electrodes and second branch electrodes that are interlaced, in which edges of the second branch electrodes are designed with positive and negative angles with respect to an alignment direction. Through the configuration, the pixel structure can be switched between a normal display state and a virtual reality display state. At the normal display state, electric fields are generated by the first branch electrodes and the second branch electrodes, thereby achieving higher brightness. At the virtual reality display state, electric fields can be generated only by the second branch electrodes, such that liquid crystals are divided into plural domains and form disclination lines, thereby enhancing the response rate of the pixel structure at the display state.

According to some embodiments of the present disclosure, a pixel structure includes a substrate, a first gate line, a second gate line, a first data line, a second data line, and at least one pixel unit. The first gate line, the second gate line, the first data line, and the second data line are located over the substrate. The first data line and the second data line intersect with the first gate line and the second gate line. The pixel unit is disposed over the substrate. The first gate line and the second gate line are located on the same side of the pixel unit, and the first data line and the second data line are located on opposite sides of the pixel unit. The pixel unit includes a first active device, a second active device, a common electrode, a first pixel electrode, and a second pixel electrode. The first active device and the second active device are electrically connected to the first data line, and are electrically connected to the first gate line and the second gate line respectively. The common electrode is electrically connected to a common voltage source. The first pixel electrode is disposed over the common electrode, and is electrically connected to the first active device. The second pixel electrode is disposed over the common electrode, and is electrically connected to the second active device. The second pixel electrode includes plural second branch electrodes, and a width of at least one of the second branch electrodes decreases from a first side of the at least one of the second branch electrodes to a second side of the at least one of the second branch electrodes.

In some embodiments, the pixel structure further includes an alignment film over the second pixel electrode. The alignment film has an alignment direction, and an extension direction of the second branch electrodes is parallel with the alignment direction.

In some embodiments, the pixel structure further includes an alignment film over the second pixel electrode. The alignment film has an alignment direction. The at least one of the second branch electrodes has two edges having a positive angle $\theta_1$ and a negative angle $\theta_2$ with respect to the alignment direction, respectively, wherein $0°<\theta_1<90°$, and $0°<\theta_2<90°$.

In some embodiments, the first pixel electrode includes a first trunk electrode and plural first branch electrodes connected to the first trunk electrode, and projections of the first branch electrodes on the substrate are arranged alternately with projections of the second branch electrodes on the substrate.

In some embodiments, the second pixel electrode is above the first pixel electrode in a direction normal to the substrate. The first pixel electrode further includes plural first side branch electrodes connected to the first trunk electrode, and projections of the first side branch electrodes on the substrate are within the projections of the second branch electrodes on the substrate.

In some embodiments, a width of at least one of the first side branch electrodes decreases in a direction, and the width of the at least one of the second branch electrodes decreases in the direction.

In some embodiments, at least one of the first branch electrodes includes a first portion, and an extension direction of the first portion of the at least one of the first branch electrodes is parallel with an extension direction of the second branch electrodes.

In some embodiments, the pixel structure further includes an alignment film over the second pixel electrode. The alignment film has an alignment direction, and the extension direction of the first portion of the at least one of the first branch electrodes is parallel with the alignment direction.

In some embodiments, the pixel structure further includes an alignment film over the second pixel electrode. The alignment film has an alignment direction, and the at least one of the first branch electrodes further includes a second portion connected to a side of the first portion. An extension direction of the second portion has an angle $\theta_3$ with respect to the alignment direction, and $0°<\theta_3<90°$.

In some embodiments, the at least one of the second branch electrodes has a side surface having an angle $\theta_1$ with respect to the alignment direction, and a complementary angle of $\theta_3$ is greater than $\theta_1$.

In some embodiments, each of the first branch electrodes has a uniform width.

In some embodiments, an extension direction of the first trunk electrode is parallel with an extension direction of the first data line.

In some embodiments, the second pixel electrode is located above the first pixel electrode in a direction normal to the substrate.

In some embodiments, the second pixel electrode further includes a second trunk electrode connected to a drain electrode of the second active device, the second branch electrodes are connected to the second trunk electrode, the first side of the at least one of the second branch electrodes is proximate to the second trunk electrode, and the second side of the at least one of the second branch electrodes is located away from the second trunk electrode.

In some embodiments, an extension direction of the second trunk electrode is parallel with an extension direction of the first data line.

In some embodiments, the second pixel electrode further includes a second trunk electrode connected to a drain electrode of the second active device, the second branch electrodes are connected to the second trunk electrode, the first side of the at least one of the second branch electrodes is away from the second trunk electrode, and the second side of the at least one of the second branch electrodes is proximate to the second trunk electrode.

In some embodiments, there is a first potential difference between the first pixel electrode and the common electrode, and there is a second potential difference between the second pixel electrode and the common electrode. At a first display state, the first potential difference is substantially zero, and an absolute value of the second potential difference is substantially greater than zero.

In some embodiments, at the first display state, the pixel unit has a transmission area and a non-transmission area, and the non-transmission area overlaps the second pixel electrode in a direction normal to the substrate.

In some embodiments, at a second display state, an absolute value of the first potential difference is substantially greater than zero, and an absolute value of the second potential difference is substantially greater than zero.

DETAILED DESCRIPTION

Figure 1A:
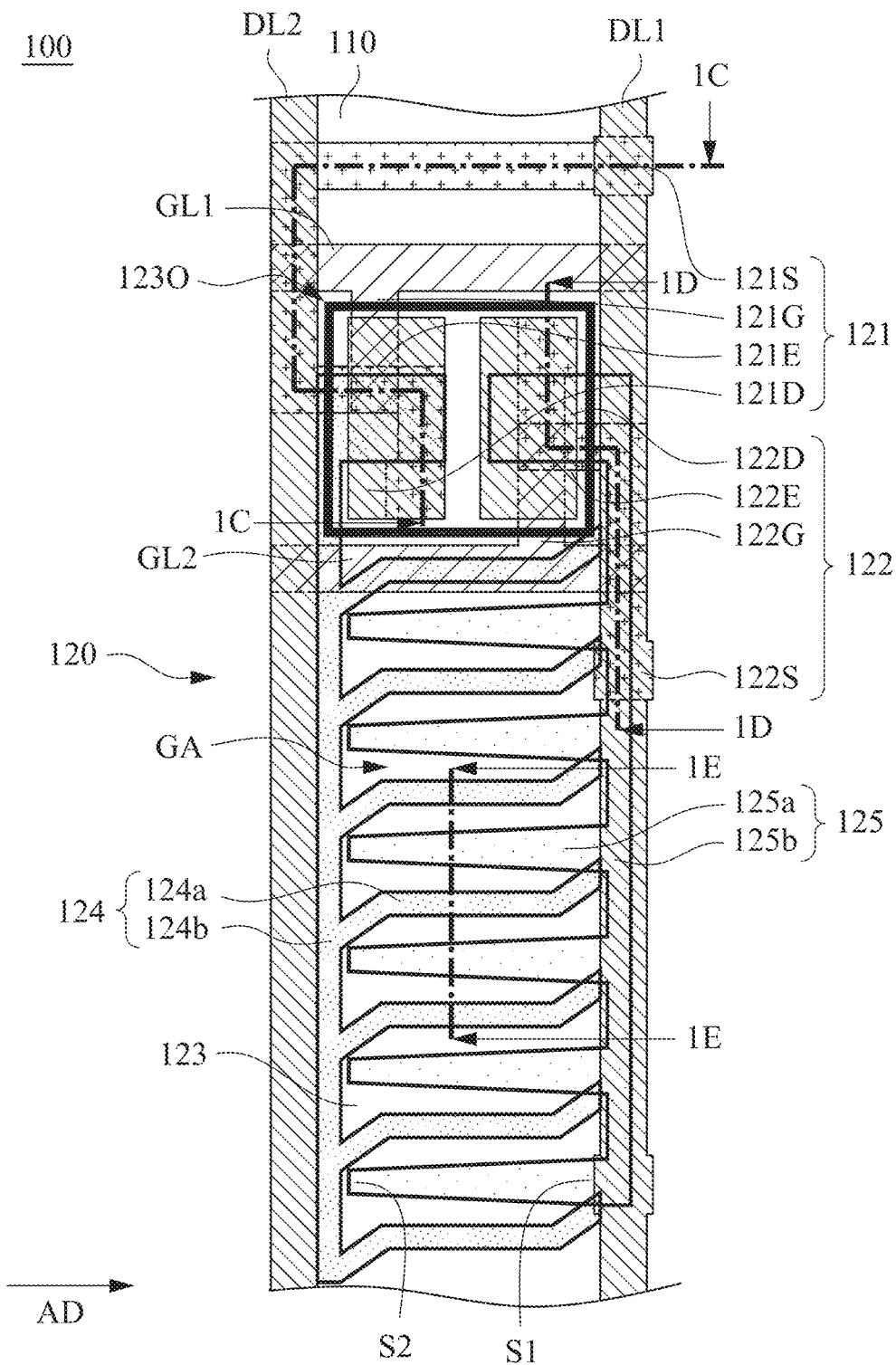
FIG. 1A is a top schematic view of a pixel structure according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
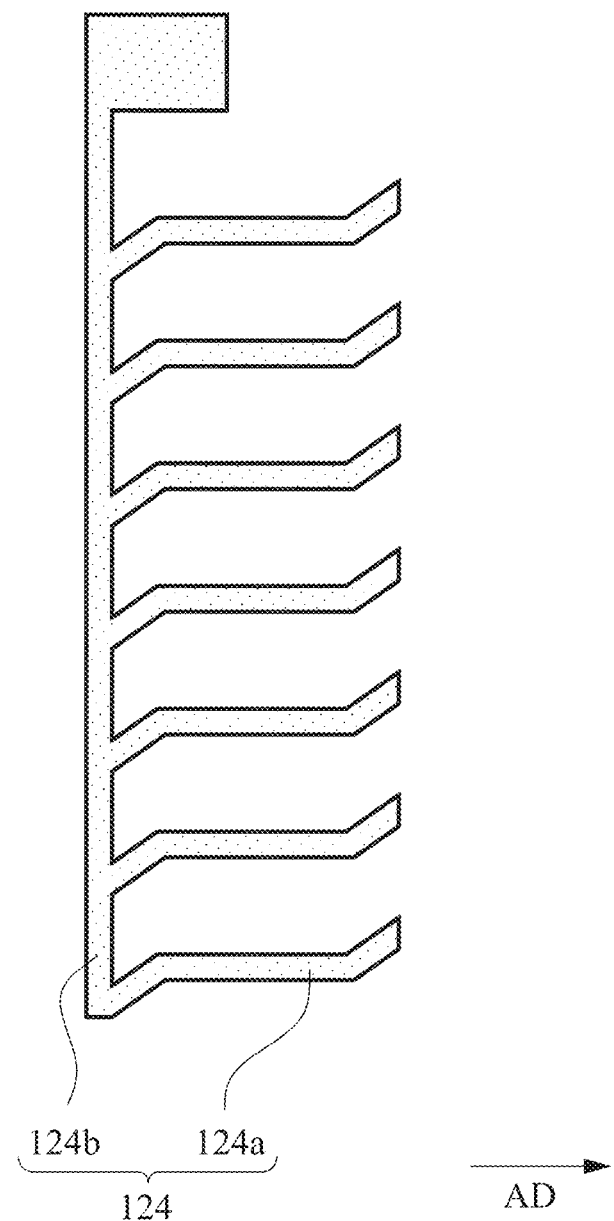
FIGS. 1B(a) to 1B(c) are schematic views of components of the pixel structure shown in FIG. 1A.
Figure 1B:
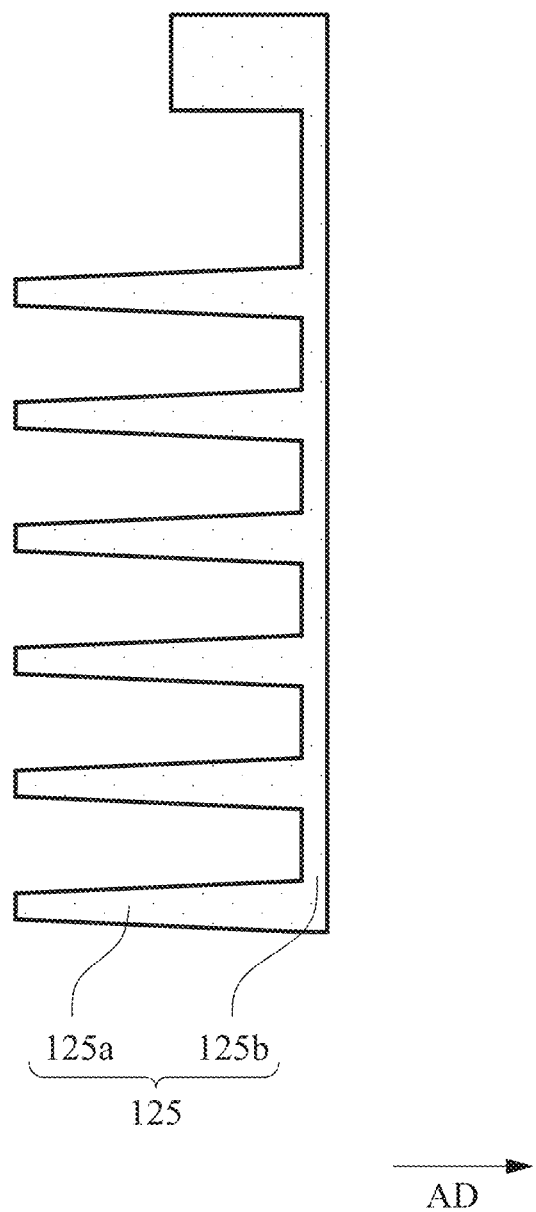
Figure 1B:
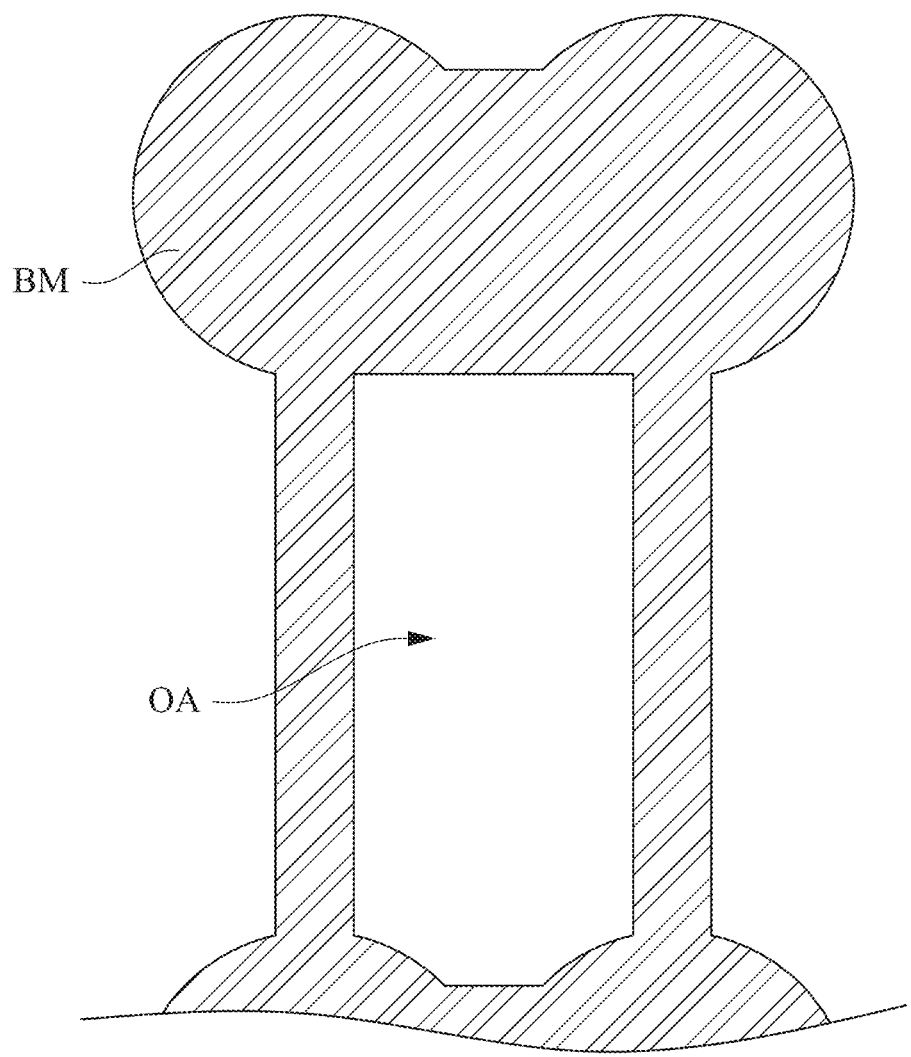
Figure 1C:
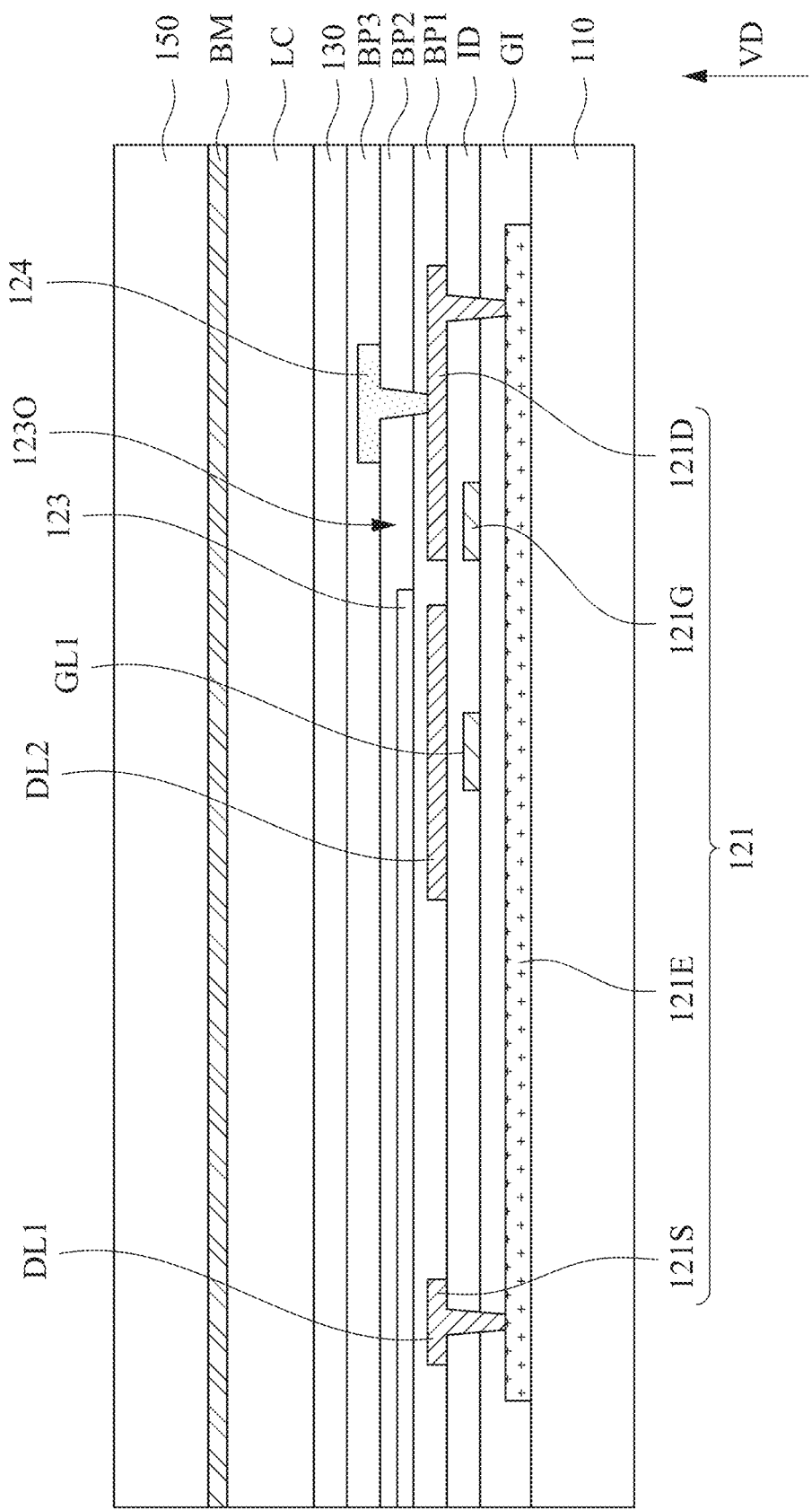
FIG. 1C is a cross-sectional view taken along line 1C-1C of FIG. 1A.
Figure 1D:
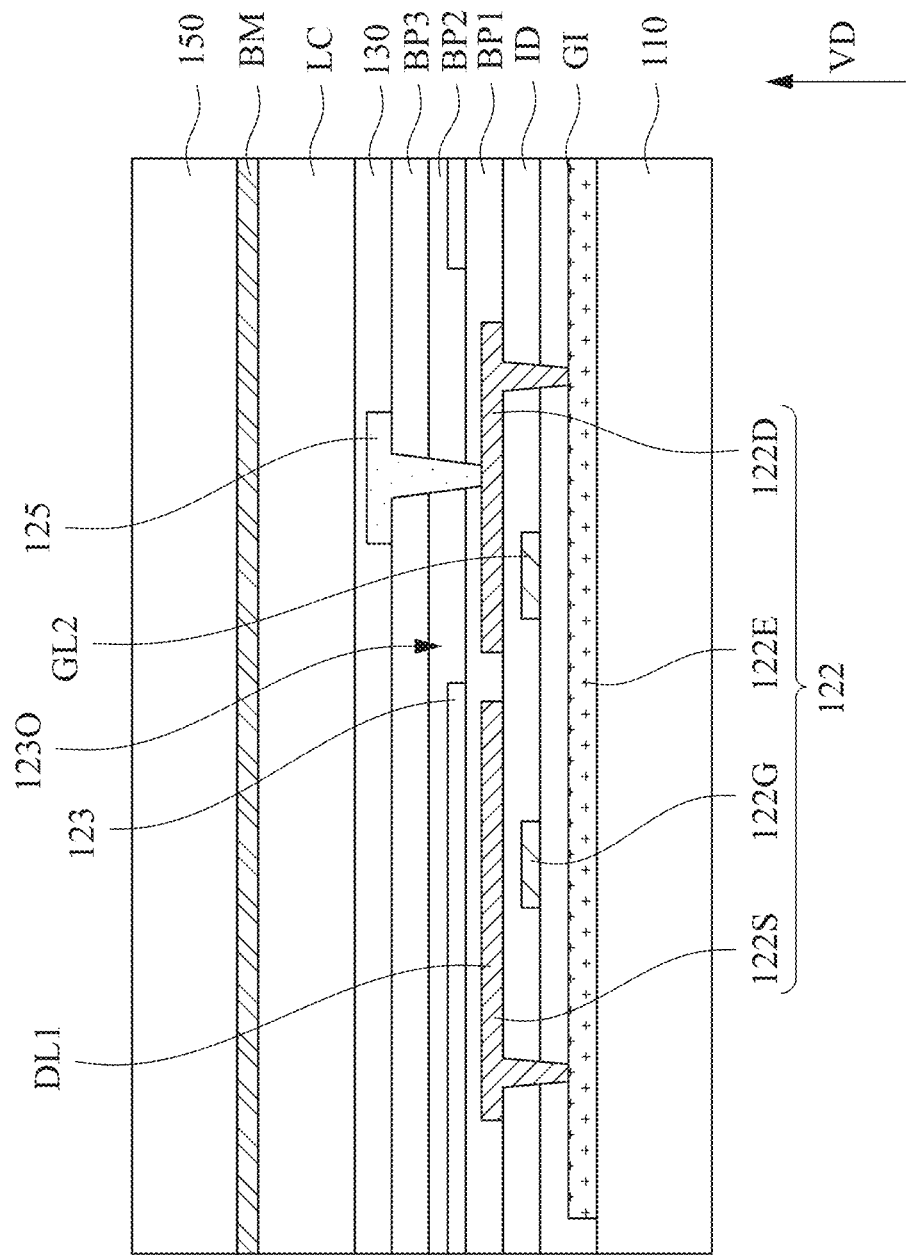
FIG. 1D is a cross-sectional view taken along line 1D-1D of FIG. 1A.

Reference is made to FIG. 1A, FIGS. 1B(a) to 1B(c), FIG. 10, and FIG. 1D. FIG. 1A is a top schematic view of a pixel structure 100 according to an embodiment of the present disclosure. FIGS. 1B(a) to 1B(c) are schematic views of components of the pixel structure 100 of FIG. 1A. FIGS. 10 and 1D are cross-sectional views taken along lines 1C-1C and 1D-1D of FIG. 1A, respectively. The pixel structure 100 includes a substrate 110, a first gate line GL1, a second gate line GL2, a first data line DL1, a second data line DL2, and at least one pixel unit 120. The first gate line GL1 and the second gate line GL2 are over the substrate 110. The first data line DL1 and the second data line DL1 are located over the substrate 110, and intersect with the first gate line GL1 and the second gate line GL2. The pixel unit 120 is located over the substrate 110. The first data line DL1 and the second data line DL2 are disposed on opposite sides of the pixel unit 120. The first gate line GL1 and the second gate line GL2 are adjacent to each other and are disposed on the same side of the pixel unit 120. In some embodiments of the present disclosure, an alignment direction AD is in a horizontal direction, and is substantially parallel with the first gate line GL1 and the second gate line GL2. For example, an angle between the alignment direction AD and an extension direction of the first gate line GL1 or an extension direction of the second gate line GL2 is zero.

The pixel unit 120 includes a first active device 121 and a second active device 122. The first active device 121 and the second active device 122 are located at least partially between the first gate line GL1 and the second gate line GL2. The first active device 121 and the second active device 122 are electrically connected to the first data line DL1, and are respectively electrically connected to the first gate line GL1 and the second gate line GL2. For example, the first active device 121 may include a semiconductor layer 121E, a source electrode 121S, a drain electrode 121D, and a gate electrode 121G. The second active device 122 may include a semiconductor layer 122E, a source electrode 122S, a drain electrode 122D, and a gate electrode 122G. The source electrode 121S of the first active device 121 and the source electrode 122S of the second active device 122 are connected to the first data line DL1. The gate electrode 121G of the first active device 121 and the gate electrode 122G of the second active device 122 are respectively connected to the first gate line GL1 and the second gate line GL2.

Herein, a portion of the semiconductor layer 121E, the drain electrode 121D, and the gate electrode 121G of the first active device 121 and a portion of the semiconductor layer 122E, the drain electrode 122D, and the gate electrode 122G of the second active device 122 are located between the first gate line GL1 and the second gate line GL2. In some embodiments, another portion of the semiconductor layer 121E and the source electrode 121S of the first active device 121 and another portion of the semiconductor layer 122E and the source electrode 122S of the second active device 122 extend out of a space between the first gate line GL1 and the second gate line GL2. In some embodiments, the first active device 121 and the second active device 122 may be located between the first gate line GL1 and the second gate line GL2. In some embodiments, for example, the gate electrode 121G of the first active device 121 extends in a direction from the first gate line GL1 toward the second gate line GL2, and the gate electrode 122G of the second active device 122 extends in a direction from the second gate line GL2 toward the first gate line GL1.

The pixel unit 120 includes a common electrode 123 (denoted by a bold line in FIG. 1A), a first pixel electrode 124 (denoted by a dense dotted pattern in FIG. 1A), and a second pixel electrode 125 (denoted by a sparse dotted pattern in FIG. 1A). The structural configurations of the common electrode 123, the first pixel electrode 124, and the second pixel electrode 125 of the pixel unit 120 are illustrated below.

In some embodiments, the common electrode 123 (only its opening is depicted) is disposed on an entire surface and has an opening 123O to expose the drain electrode 121D of the first active device 121 and the drain electrode 122D of the second active device 122. Therefore, the first pixel electrode 124 may be electrically connected to the drain electrode 121D of the first active device 121, and the second pixel electrode 125 may be electrically connected to the drain electrode 122D of the second active device 122. The common electrode 123 is electrically connected to a common voltage source, which provides stable electric potential, such as ground potential.

The first pixel electrode 124 is disposed over the common electrode 123 and is electrically connected to the first active device 121. In some embodiments, the first pixel electrode 124 includes plural first branch electrodes 124a and a first trunk electrode 124b. The first branch electrodes 124a are connected to the first trunk electrode 124b, and an extension direction of the first branch electrodes 124a is different from that of the first trunk electrode 124b. For example, an extension direction of at least a portion of the first branch electrodes 124a is parallel with the alignment direction AD, and the extension direction of the first trunk electrode 124b is orthogonal to the alignment direction AD. As shown in the figures, the first trunk electrodes 124b is adjacent to the second data line DL2, and the extension direction of the first trunk electrodes 124b is parallel with the extension direction of the second data line DL2. The first trunk electrodes 124b is connected to the drain electrode 121D of the first active device 121.

The second pixel electrode 125 is disposed over the common electrode 123, and is electrically connected to the second active device 122. In some embodiments of the present disclosure, the second pixel electrode 125 includes plural second branch electrodes 125a and a second trunk electrode 125b. The second branch electrodes 125a are connected to the second trunk electrode 125b, and an extension direction of the second branch electrodes 125a is different from an extension direction of the second trunk electrode 125b. For example, the extension direction of the second branch electrodes 125a is parallel with the alignment direction AD, and the extension direction of the second trunk electrode 125b is orthogonal to the alignment direction AD. As shown in the figures, the second trunk electrode 125b is adjacent to the first data line DL1, and the extension direction of the second trunk electrode 125b is parallel with the extension direction of the first data line DL1. The second trunk electrode 125b is connected to the drain electrode 122D of the second active device 122.

In some embodiments, the pixel structure 100 may further include a black matrix BM which is formed from a low-transmittance material, such as black inks. The black matrix BM has an opening area OA, as shown in FIG. 1B(c). Herein, the common electrode 123, the first branch electrodes 124a of the first pixel electrode 124, and the second branch electrodes 125a of the second pixel electrode 125 are disposed in the opening area OA, thereby realizing display effect. In some embodiments, the first gate line GL1 and the second gate line GL2 adjacent to the first gate line GL1 are disposed outside the opening area OA (referring to FIG. 1B) and on the same side of the pixel units 120. However, the scope of the present disclosure is not limited thereto. In some embodiments, the first gate line GL1 and the second gate line GL2 may be disposed outside the opening area OA and on opposite sides of the pixel units 120.

Figure 1E:
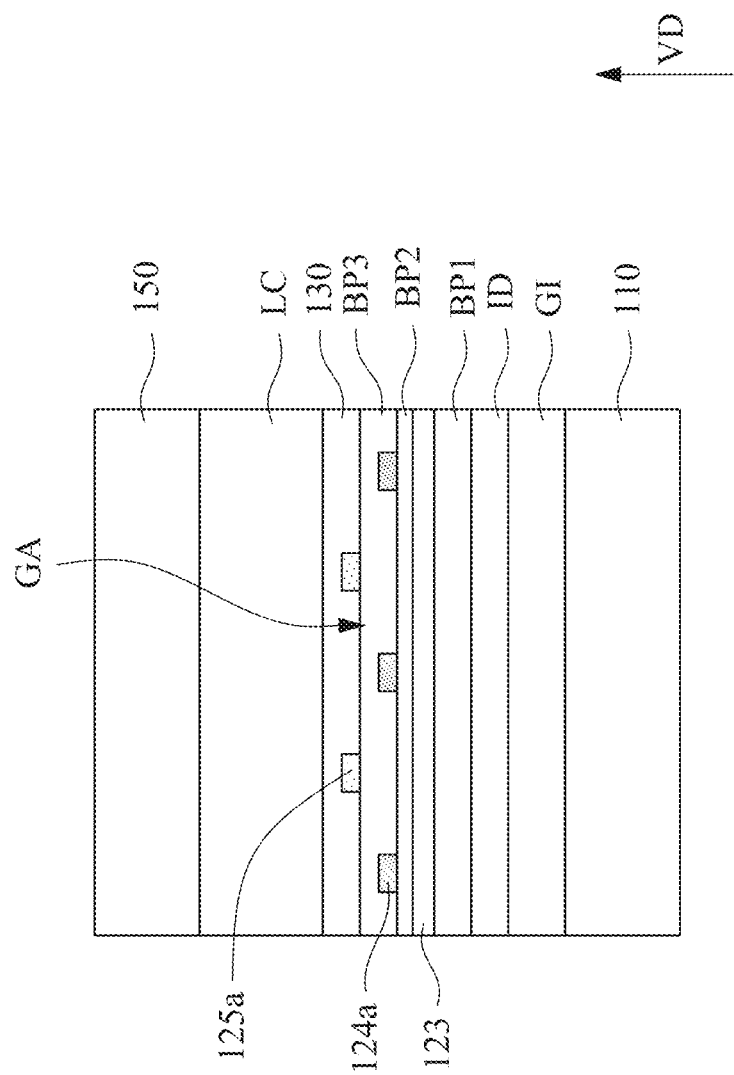
FIG. 1E is a cross-sectional view taken along line 1E-1E of FIG. 1A.

FIG. 1E is a cross-sectional view taken along line 1E-1E of FIG. 1A. Reference is made to FIGS. 1A to 1E. The first trunk electrode 124b and the second trunk electrode 125b are disposed on opposite sides of the pixel unit 120. The first branch electrodes 124a extend in a direction from the first trunk electrode 124b toward the second trunk electrode 125b, and the second branch electrodes 125a extend in a direction from the second trunk electrode 125b toward the first trunk electrode 124b. Herein, the projections of the first branch electrodes 124a over the substrate 110 are arranged alternately with projections of the second branch electrodes 125a on the substrate 110. The first branch electrodes 124a and the second branch electrodes 125a are separated by appropriate gaps GA. Though the configuration, the electric field generated by the common electrode 123 and the first branch electrodes 124a (or the second branch electrodes 125a) may extend upward through the gaps GA, thereby controlling orientations of liquid crystal molecules and realizing Fringe Field Switching (FFS).

Reference is made to FIG. 1C to FIG. 1E. The pixel unit 120 includes an alignment film 130 over the second pixel electrode 125. In some embodiments, the alignment film 130 may be made of polyimide, and may have the alignment direction AD by using a suitable alignment method (e.g., a rubbing method). Alternatively, the alignment film 130 may be made of another suitable material and has the alignment direction AD by using a method such as vapor deposition, photo alignment, ion beam alignment, or nano-structuring printing.

In the present embodiments, in a direction VD normal to the substrate 110 (hereinafter referred to as a substrate normal direction VD), the second pixel electrode 125 is over the first pixel electrode 124 (e.g., the first branch electrodes 124a). However, the scope of the present disclosure is not limited thereto. In some embodiments, the first pixel electrode 124 may be disposed over the second pixel electrode 125.

Herein, the pixel structure 100 may further include a liquid crystal layer LC and a counter substrate 150. The liquid crystal layer LC is sandwiched between the substrate 110 and the counter substrate 150. In some embodiments of the present disclosure, the black matrix BM may be optionally disposed on a side of the substrate 110 or the counter substrate 150 facing the liquid crystal layer LC. Furthermore, the pixel structure 100 may further include a color filter layer optionally disposed on the substrate 110 or on the side of the counter substrate 150 facing the liquid crystal layer LC.

In the pixel structure 100, the common electrode 123, the first pixel electrode 124, and the second pixel electrode 125 are separated from each other. To be specific, the pixel structure 100 includes the substrate 110, a gate dielectric layer GI, a dielectric layer ID, a first dielectric layer BP1, a second dielectric layer BP2, and a third dielectric layer BP3. The semiconductor layer 121E of the first active device 121 and the semiconductor layer 122E of the second active device 122 are disposed over the substrate 110, and the first gate line GL1 (the gate electrode 121G) and the second gate line GL2 (the gate electrode 122G) are disposed over the substrate 110. The gate dielectric layer GI is disposed between the gate electrode 121G and the semiconductor layer 121E of the first active device 121, and between the gate electrode 122G and the semiconductor layer 122E of the second active device 122. The dielectric layer ID covers the first gate lines GL1 and the second gate lines GL2. The first data lines DL1 and the second data lines DL2, the source electrodes 121S and 122S, and the drain electrodes 121D and 122D of the first active devices 121 and the second active devices 122 are disposed over the dielectric layer ID. The first dielectric layer BP1 covers the first data lines DL1 and the second data lines DL2, the source electrodes 121S and 122S, and the drain electrodes 121D and 122D of the first active devices 121 and the second active devices 122. The common electrode 123 is disposed over the first dielectric layer BP1, and the second dielectric layer BP2 covers the common electrode 123. The first pixel electrode 124 is disposed over the second dielectric layer BP2, and the third dielectric layer BP3 covers the first pixel electrode 124. The second pixel electrode 125 is disposed over the third dielectric layer BP3. Herein, plural vias are formed in the gate dielectric layer GI, the dielectric layer ID, the first dielectric layer BP1, the second dielectric layer BP2, and the third dielectric layer BP3, such that the respective pixel electrodes may be electrically connected to the active devices through the vias. The common electrode 123 has an opening 123O, such that the first pixel electrode 124 and the second pixel electrode 125 are electrically connected to the first active device 121 and the second 122 through the opening 123O respectively. As a result, the common electrode 123, the first pixel electrode 124, and the second pixel electrode 125 are electrically isolated from each other.

Through the above configuration, the first pixel electrode 124 and the second pixel electrode 125 of the pixel unit 120 may be individually controlled by the first gate line GL1 and the second gate line GL2. Through the configuration, according to a user's choice, the pixel structure 100 may be operated in two display states: a first display state and a second display state. At the first display state, the electric field is generated by only the second pixel electrode 125 and the common electrode 123. At the second display state, the first pixel electrode 124 and the second pixel electrode 125 respectively generate the electric fields with the common electrode 123. In some embodiments, the first display state is often used in a virtual reality (VR) display, and the second display state is often used in a non-VR display. Through the configuration, the display panel that the pixel structure 100 applicable to can be switched between the VR display and the non-VR display. The detail operations are illustrated later.

In some embodiments of the present disclosure, the second pixel electrode 125 includes at least one second branch electrode 125a, and a width of the second branch electrode 125a decreases from a first side S1 of the second branch electrode 125a to a second side S2 of the second branch electrode 125a. Through shrinking the width, at the first display state, the electric field between the second pixel electrode 125 and the common electrode 123 may orientate liquid crystal molecules in a specific direction, such that the liquid crystal molecules a divided into plural domains and disclination lines are formed, thereby increasing the response rates at the first display state. The configuration satisfies the requirement of VR response rate.

Figure 1F:
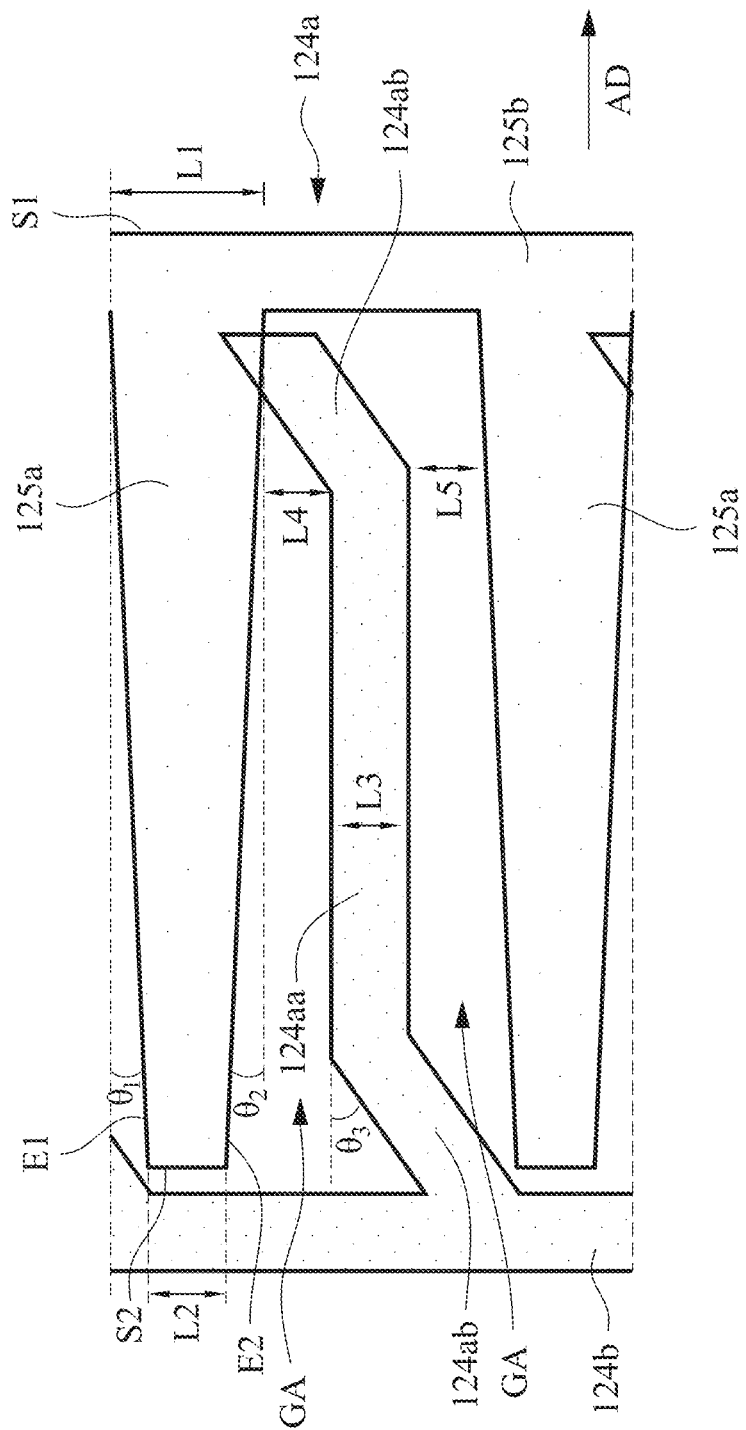
FIG. 1F is a partial enlarged view of the pixel structure of FIG. 1A.

FIG. 1F is a partial enlarged view of the pixel structure 100 of FIG. 1A. The second branch electrode 125a has two edges E1 and E2 which have a positive angle and a negative angle with respective to the alignment direction AD respectively. For example, the edge E1 has a positive angle $\theta_1$ with respective to the alignment direction AD, and the edge E2 has a negative angle $\theta_2$ with respect to the alignment direction AD, in which $0°<\theta_1<90°$, and $0°<\theta_2<90°$. In some embodiments, $\theta_1$ is equal to $\theta_2$. For example, $\theta_1$ and $\theta_2$ are both 30°. In some embodiments, $\theta_1$ is not equal to $\theta_2$. In some embodiments, $\theta_1$ may be smaller than $\theta_2$. For example, $\theta_1$ is 20°, and $\theta_2$ is 30°. In some embodiments, $\theta_1$ may be greater than $\theta_2$. For example, $\theta_1$ is 30°, and $\theta_2$ is 20°.

In some embodiments of the present disclosure, at least one of the first branch electrodes 124a includes a first portion 124aa and a second portion 124ab. The second portion 124ab is connected to a side of the first portion 124aa. The first portion 124aa and the second portion 124ab have different extension directions.

In some embodiments, the extension direction of the first portion 124aa of the at least one of the first branch electrodes 124a is parallel with the alignment direction AD. That is, the extension direction of the first portion 124aa of the first branch electrode 124a has a zero-degree angle, with respective to the alignment direction AD. For example, the extension direction of the first portion 124aa of the first branch electrode 124a is parallel with the extension direction of the second branch electrodes 125a. In some embodiments, an extension direction of the second portion 124ab has an angle $\theta_3$ with respect to alignment direction AD, and $0°<\theta_3<90°$. Herein, each first portion 124aa may be connected to one or two second portions 124ab, and the second portions 124ab connected to the same first portion 124aa may have the same extension direction.

Through the above configuration, the first portion 124aa of the first branch electrode 124a have less influence on the orientation of the liquid crystal molecules, while the second portion 124ab of the first branch electrode 124a have more influence on the orientation of the liquid crystal molecules. In some embodiments of the present disclosure, the complementary angle of $\theta_3$ is greater than $\theta_1$ and $\theta_2$. That is, $(90°-\theta_3)>\theta_1$, and $(90°-\theta_3)>\theta_2$. Through the configuration, the orientation of the liquid crystal molecules is influenced by the second portion 124ab of the first branch electrode 124a more than by the second branch electrode 125a. The second portion 124ab of the first branch electrode 124a may dominate the orientation of the liquid crystal molecules at the second display state, such that the liquid crystal molecules are orientated in a consistent direction.

In some embodiments, the width of the first branch electrode 124a is uniform. That is, the first portion 124aa and the second portion 124ab have the same width L3. For example, the width L3 ranges from 0.5 micrometer to 10 micrometers. However, the scope of the present disclosure is not limited thereto. In some embodiments, the first portion 124aa and the second portion 124ab may have different widths.

In the present embodiments, a width L1 at the first side S1 of the second branch electrode 125a is greater than a width L2 at the second side S2 of the second branch electrodes 125a. However, the scope of the present disclosure is not limited thereto. In some embodiments, the width L1 of at the first side S1 may be smaller than the width L2 at the second side S2. For example, the width L1 of at the first side S1 ranges from 0.5 micrometers to 10 micrometers, and the width L2 at the second side S2 ranges from 0.5 micrometers to 10 micrometers.

In some embodiments, the shape of the second branch electrode 125a is trapezoidal, in which the first side S1 of the second branch electrode 125a is parallel with the second side S2 of the second branch electrode 125a. However, the scope of the present disclosure is not limited thereto. In some embodiments, the second branch electrode 125a may be in another shape as long as the edges E1 and E2 of the second branch electrode 125a have positive and negative angles with respect to the alignment direction AD respectively, which will be illustrated in detail later.

In some embodiments, at a corner of the first branch electrode 124a (i.e., the connection position of the first portion 124aa and the second portion 124ab), the gap GA has proper widths L4 and L5 ranging from 0.5 micrometer to 10 micrometers. Herein, the widths L4 and L5 are referred to as the shortest distances between the first portion 124aa of the first branch electrode 124a and the second branch electrodes 125a along a direction normal to the alignment direction AD.

Herein, the common electrode 123, the first pixel electrode 124, and the second pixel electrode 125 may be made of transparent conductive materials, such as a transparent conductive oxide (TCO), nano-metal meshes, or other suitable materials. For example, the transparent conductive oxide may be a metal oxide (e.g. indium tin oxide, indium zinc oxide, aluminum tin oxide, aluminum zinc oxide, indium gallium zinc oxide, other suitable oxide, or the stacked layers of at least two above materials). In some embodiments, the common electrode 123, the first pixel electrode 124, and the second pixel electrode 125 may be formed from a reflective conductive material, such as silver, copper, and titanium. Materials of the common electrode 123, the first pixel electrode 124, and the pixel electrode 125 may be the same or different.

Herein, the present embodiments are illustrated in a configuration that the alignment direction AD is parallel with the first gate line GL1 and the second gate line GL2, but the scope of the present disclosure is not limited thereto. In some embodiments, the alignment direction AD may be parallel with the first data line DL1 and the second data line DL2 (referring to FIG. 3). In the figures of various embodiments of the present disclosure, the alignment direction AD is not limited to the direction indicated by the arrow. For example, the alignment direction AD may be opposite to the direction indicated by the arrow. For example, in the present embodiments, the alignment direction AD may be a positive X-direction or a negative X-direction.

It should be noted that, herein, the first pixel electrode 124 and the second pixel electrode 125 include trunk electrodes and branch electrodes, but the scope of the present disclosure is not limited thereto. In some embodiments, the first pixel electrode 124 includes the first branch electrodes 124a, rather than the first branch electrodes 124b. In some embodiments, the second pixel electrode 125 includes the second branch electrodes 125a, rather than the second trunk electrode 125b, for example, when the alignment direction AD is parallel with the first data line DL1 and the second data line DL2.

Figure 2A:
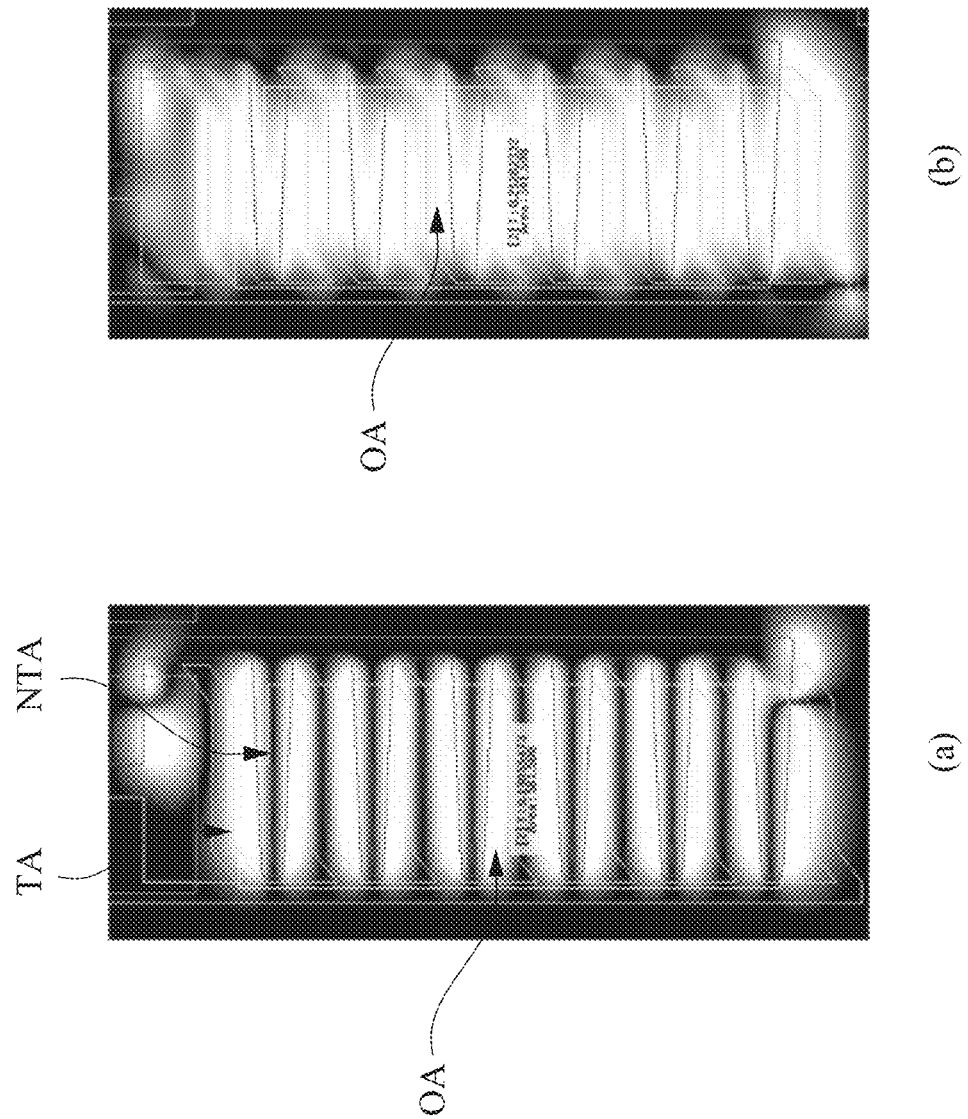
FIG. 2A is an optical simulation result according to the pixel structure of FIG. 1A.
Figure 2B:
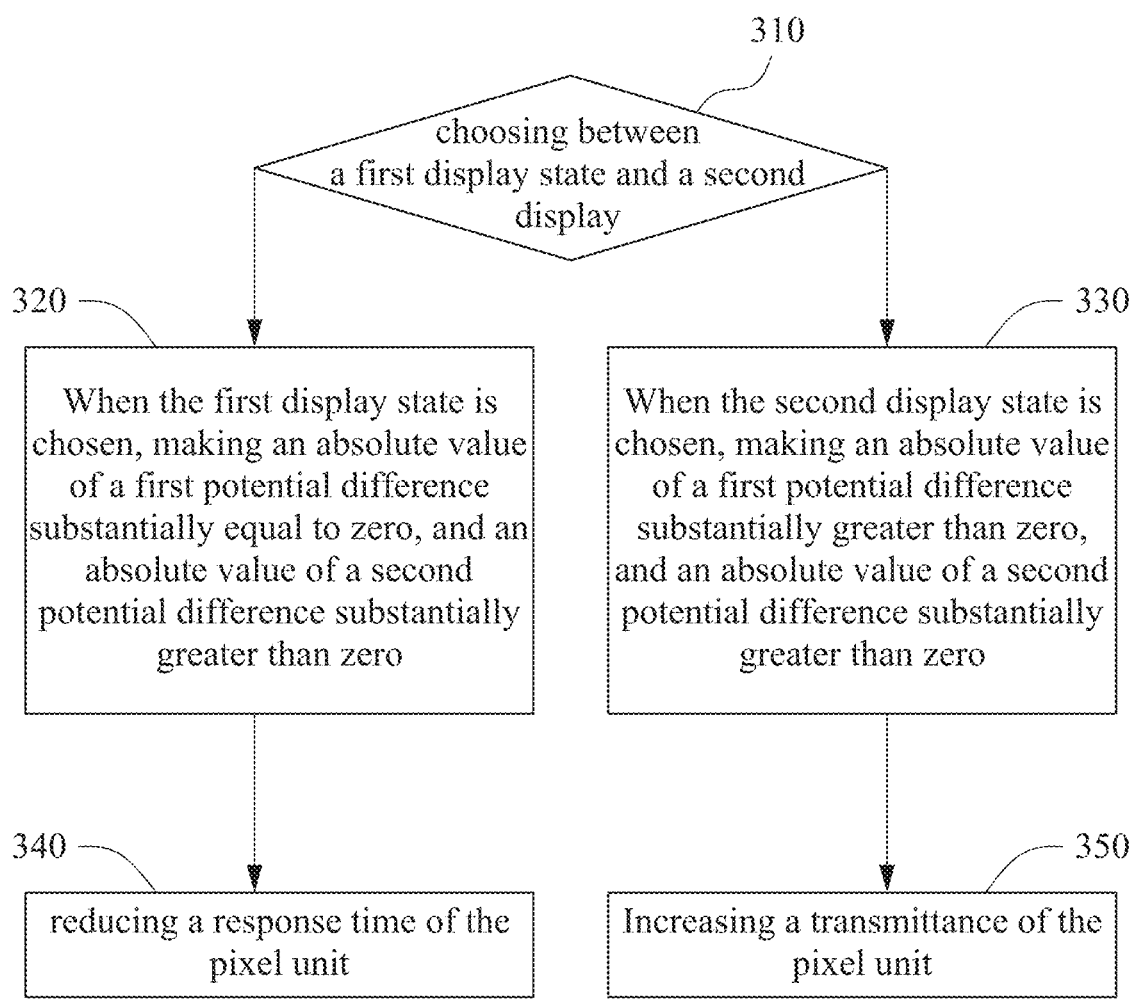
FIG. 2B is a block diagram of a pixel structure according to some embodiments of the present disclosure.

FIG. 2A is an optical simulation result according to the pixel structure 100 of FIG. 1A. FIG. 2B is a block diagram of the pixel structure according to some embodiments of the present disclosure. At step 310, a user may choose between the first display state and the second display state according to requirements. The figure (a) of FIG. 2A is the optical simulation result according to the pixel structure 100 at the first display state (e.g., the VR display mode). The figure (b) of FIG. 2A is the optical simulation result according to the pixel structure 100 at the second display state (e.g., the non-VR display mode). Reference is made to FIG. 1A, FIG. 2A, and FIG. 2B. For better illustration, herein, the common electrode 123, the first pixel electrode 124, and the second pixel electrode 125 are defined to have voltages V123, V124, and V125, respectively. There is a first potential difference between the first pixel electrode 124 and the common electrode 123. For example, an absolute value $\Delta V1$ of the first potential difference is an absolute value of (voltage V123-voltage V124). There is a second potential difference between the second pixel electrode 125 and the common electrode 123. For example, an absolute value $\Delta V2$ of the second potential difference is an absolute value of (voltage V123-voltage V125).

When the user chooses the first display state (e.g. the VR display mode), referring to step 320, through the controlling system of the pixel structure, the active devices, the data lines, the scan lines are controlled, such that the absolute value $\Delta V1$ of the first potential difference is substantially equal to zero, and the absolute value $\Delta V2$ of the second potential difference is substantially greater than zero. Reference is made to FIG. 1 and the figure (a) of FIG. 2A. Through the configuration, the electric field is only generated by the second pixel electrode 125 and the common electrode 123. The first branch electrodes 124a may have the same voltage potential with the common electrode 123. Alternatively, the first branch electrodes 124a may be floating. Herein, the liquid crystal molecules are orientated in the direction of the electric field generated by the second branch electrodes 125a and the common electrode 123. As such, since the edges E1 and E2 have positive and negative angles with respect to the alignment direction AD respectively, the liquid crystal molecules between the adjacent second branch electrodes 125a have positive and negative orientation angles, thereby forming plural domains and disclination lines dividing the domains.

At the first display state (e.g., the VR display mode), the opening area of the pixel unit 120 has a transmission area TA and a non-transmission area NTA. The transmittance of the non-transmission area NTA is smaller than the transmittance of the transmission area TA. To be specific, the non-transmission area NTA is an area at which the disclination lines are located, and the transmission area TA is an area at which the domains are located. The liquid crystal molecules in two adjacent domains have different orientation angles. Herein, the non-transmittance NTA is overlapped with the second pixel electrode 125 in the substrate normal direction VD.

When the user chooses the second display state (e.g., the non-VR display mode), referring to step 330, through the controlling system (not shown) of the pixel structure, the active devices, the data lines, the scan lines are controlled, such that the absolute value $\Delta V1$ of the first potential difference is substantially greater than zero, and the absolute value $\Delta V2$ of the second potential difference is substantially greater than zero. Reference is made to FIG. 1 and the figure (b) of FIG. 2A. Through the configuration, the first branch electrodes 124a and the second branch electrodes 125a generate the electric fields with the common electrode 123 respectively, and the rotations of the liquid crystal molecules are influenced by these electric fields. Herein, the electric field generated by the second portion 124ab of the first branch electrodes 124a and the common electrode 123 has a greater rotational torque to the liquid crystal molecules than that of the electric field generated by the second branch electrode 125a and the common electrode 123. As such, the liquid crystal molecules tend to be orientated in the direction of the electric field generated by the second portion 124ab of the first branch electrodes 124a and the common electrode 123. Therefore, at the non-VR display mode, the liquid crystal molecules between the first branch electrodes 124a are dominated by the second portion 124ab of the first branch electrodes 124a and be orientated in the same direction, such that no disclination lines is formed, and all of the opening area OA is a transmittance area.

In some embodiments of the present disclosure, at the first display state (e.g., the VR display mode), referring to step 320, there are more disclination lines in the pixel unit 120. The response time of the pixel unit 120 at the first display state (e.g., the VR display mode) is smaller than that of the pixel unit 120 at the second display state (e.g., the non-VR display mode). In other words, the response rate of the pixel unit 120 at the first display state (e.g., the VR display mode) is greater than that of the pixel unit 120 at the second display state (e.g., the non-VR display mode). In some embodiments of the present disclosure, at the second display state (e.g., the non-VR display mode), referring to step 350, since there are fewer disclination lines in the pixel unit 120, the transmittance of the pixel unit 120 is greater than that of the pixel unit 120 at the first display state (e.g., the VR display mode).

Figure 3:
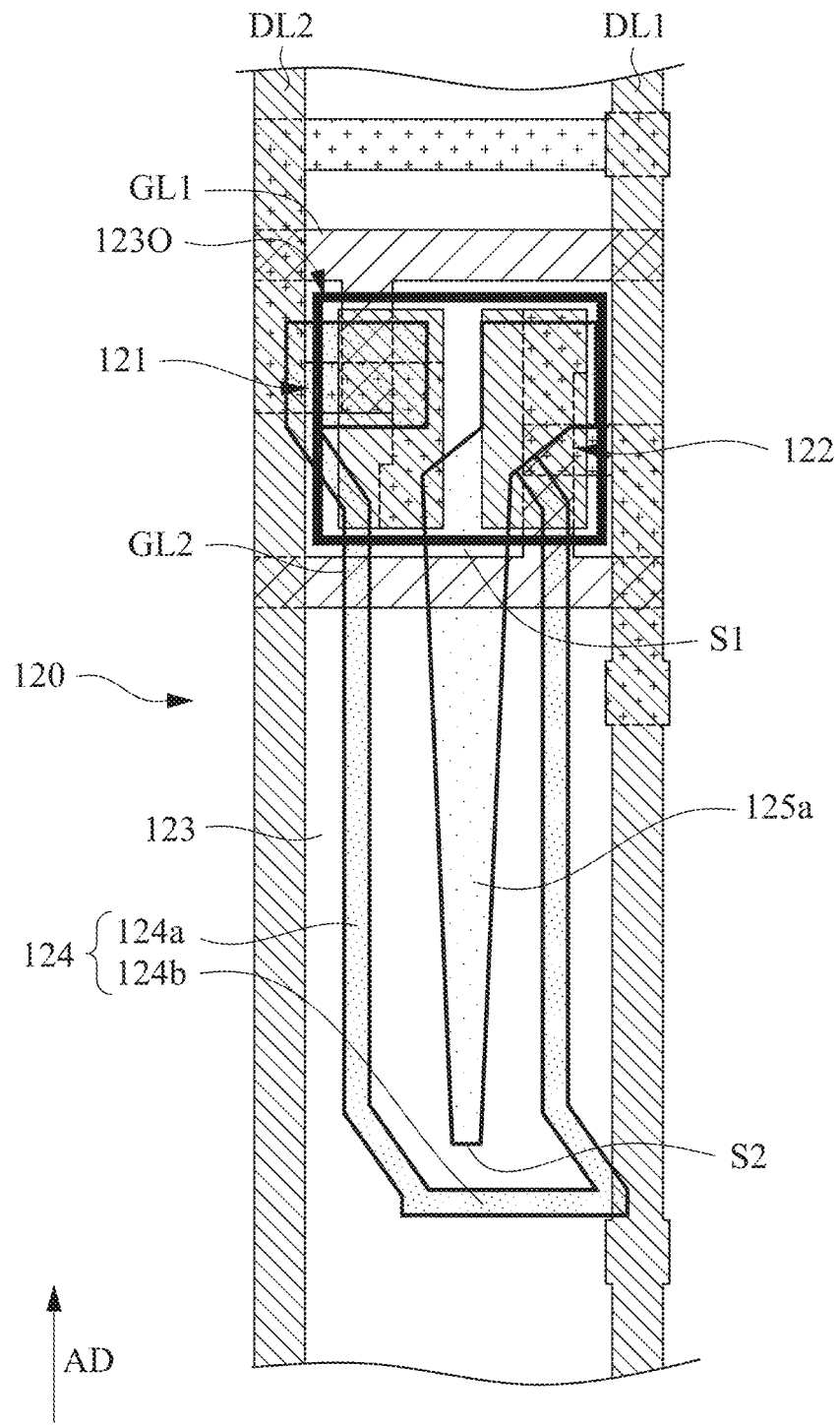
FIG. 3 is a top schematic view of a pixel structure according to another embodiment of the present disclosure.

FIG. 3 is a top schematic view of a pixel structure 100 according to another embodiment of the present disclosure. The difference between the present embodiment and the previous embodiment is that: in the present embodiment, the alignment direction AD may be parallel with the first date line DL1 and the second data line DL2.

As the first pixel electrode 124 and the second pixel electrode 125 in the previous embodiment, the first branch electrode 124a and the second branch electrode 125a extends along the alignment direction AD. The width of the second branch electrode 125a decreases from the first side S1 of the second branch electrode 125a to the second side S2 of the second branch electrodes 125a. Herein, the second pixel electrode 125 does not include the second trunk electrode 125b.

Other details of the present embodiment are similar to the aforementioned embodiments, and are not repeated herein.

Figure 4:
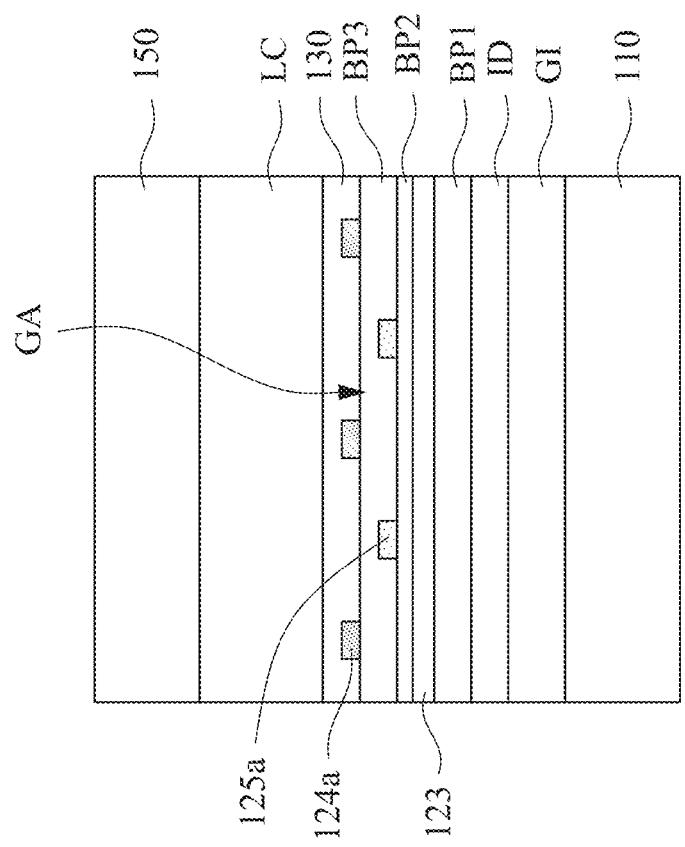
FIG. 4 is a cross-sectional view of a pixel structure according to another embodiment of the present disclosure.

FIG. 4 is a cross-sectional view of a pixel structure according to another embodiment of the present disclosure. In some embodiments of the present disclosure, in the substrate normal direction VD, the first pixel electrode 124 is disposed over the second pixel electrode 125. As described above, the common electrode 123, the first pixel electrode 124, and the second pixel electrode 125 are electrically isolated from each other by the first dielectric layer BP1, the second dielectric layer BP2, and the third dielectric layer BP3.

Other details of the present embodiments are similar to those aforementioned embodiments, and are not repeated herein.

Figure 5:
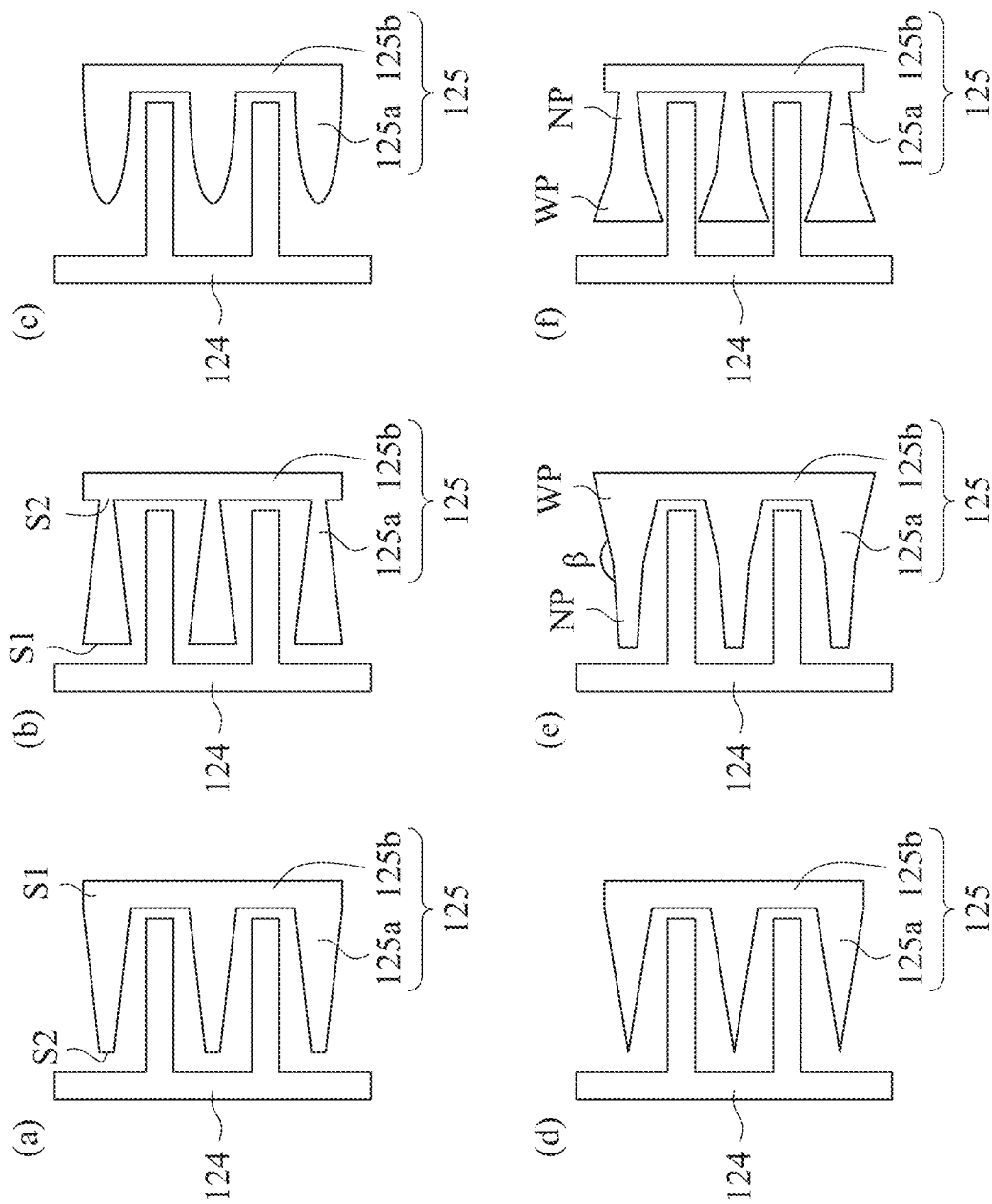
FIG. 5 illustrates top schematic views of electrode configurations of pixel structures according to plural examples of the present disclosure.

FIG. 5 illustrates top schematic views of electrode configurations of pixel structures 100 according to plural examples of the present disclosure. Examples (a) to (g) are illustrated below.

In example (a), as shown by the embodiments of FIG. 1A, the first side S1 of the second branch electrode 125a is adjacent to the second trunk electrode 125b, and the second side S2 of the second branch electrode 125a is located away from the second trunk electrode 125b. In other words, the width of the second branch electrode 125a decreases from near the second trunk electrode 125b to far away from the second trunk electrode 125b.

Example (b) is similar to example (a), and the difference between the examples (b) and (a) is that: the first side S1 of the second branch electrode 125a is located away from the second trunk electrode 125b, and the second side S2 of the second branch electrode 125a is located near the second trunk electrode 125b. In other words, the width of the second branch electrode 125a decreases from away from the second trunk electrode 125b to near the second trunk electrode 125b.

Example (c) is similar to example (a), and the difference between the examples (c) and (a) is that: the shape of one of the second branch electrodes 125a is a portion of an ellipse or a semi-ellipse.

Example (d) is similar to example (a), and the difference between the examples (d) and (a) is that: the shape of one of the second branch electrodes 125a is a triangle. For example, the shape of one of the second branch electrodes 125a may be equilateral triangle. Herein, the width of the second branch electrode 125a decreases from near the second trunk electrode 125b to away from the second trunk electrode 125b.

Example (e) is similar to example (a), and the difference between the examples (e) and (a) is that: the second branch electrode 125a has a narrow portion NP and a wide portion WP. A width of the wide portion WP is greater a width of the narrow portion NP. An edge of the narrow portion NP has an external angle β with respect to an edge of the wide portion WP. The external angle β is less than 180° and greater than 90°. Herein, the width of the second branch electrode 125a decreases from near the second trunk electrode 125b to away from the second trunk electrode 125b.

Example (f) is similar to example (e), and the difference between the examples (f) and (e) is that: the width of the second branch electrode 125a decreases from away from the second trunk electrode 125b to near the second trunk electrode 125b.

Other details of the above examples are similar to those aforementioned, and not repeated herein.

Figure 6A:
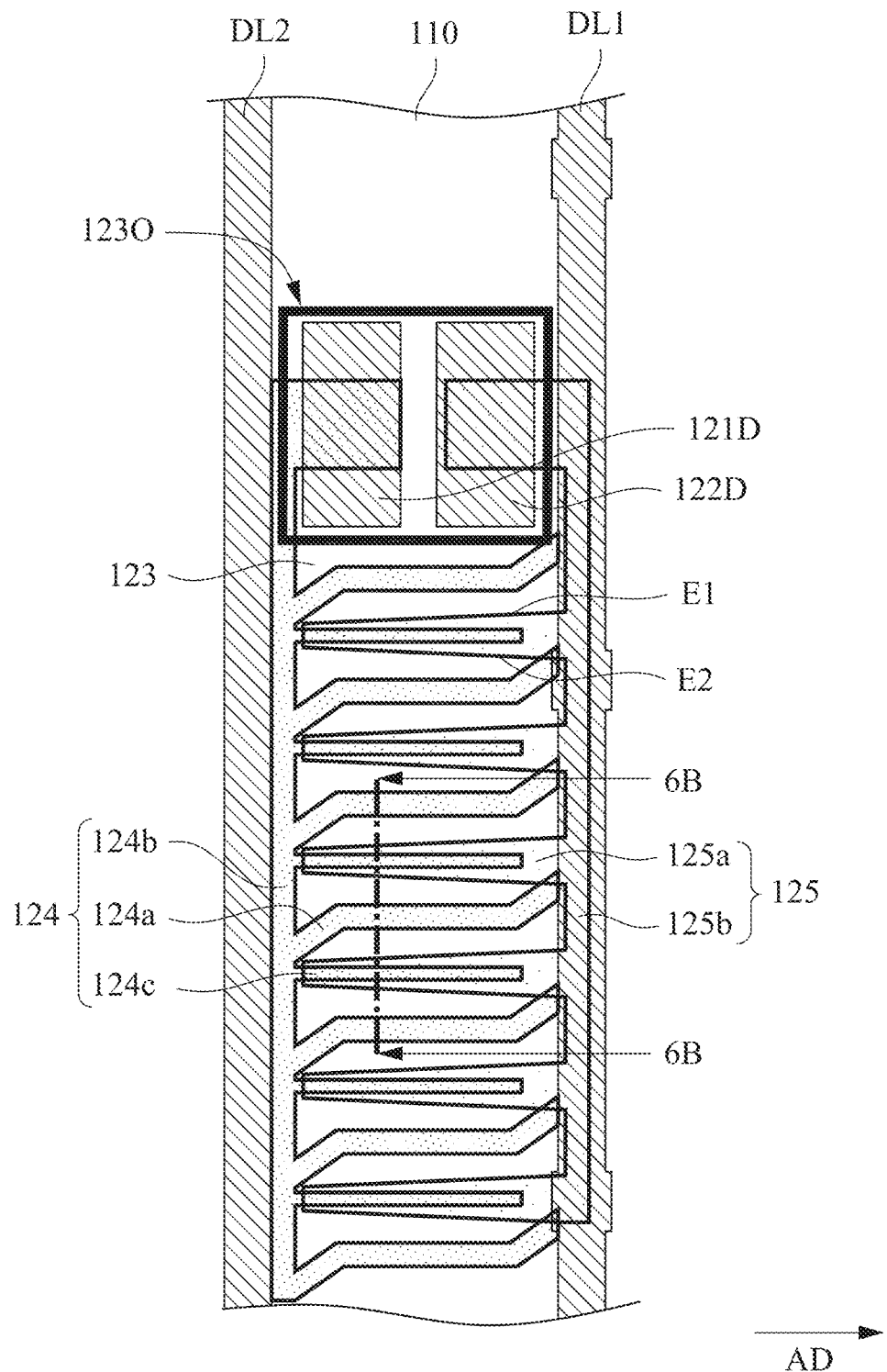
FIG. 6A is a top schematic view of a pixel structure according to another embodiment of the present disclosure.
Figure 6B:
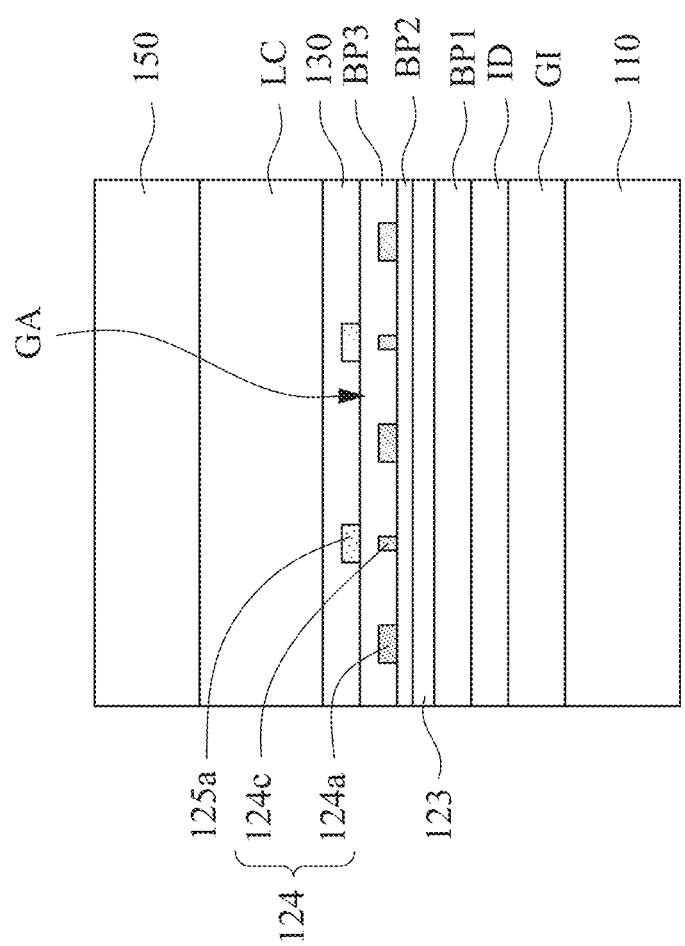
FIG. 6B is a cross-sectional view taken along line 6B-6B of FIG. 6A.

FIG. 6A is a top schematic view of a pixel structure 100 according to another embodiment of the present disclosure. FIG. 6B is a cross-sectional view taken along line 6B-6B of FIG. 6A. Herein, for better illustration, the first gate line GL1, the second gate line GL2, the source electrode, the gate electrode, and the semiconductor layer of the first active device 121 and the second active device 122 are omitted in the figure, and the details thereof are similar to those aforementioned, and thus not repeated herein. The present embodiments are similar to the embodiments of FIG. 1A, and the difference between the present embodiments and the embodiments of FIG. 1A is that: the first pixel electrode 124 includes plural first side branch electrodes 124c. The first side branch electrodes 124c and the first branch electrodes 124a are connected to the same side of the first trunk electrode 124b, and the first side branch electrodes 124c are alternatively arranged with the first branch electrodes 124a. Vertical projections of the first side branch electrodes 124c on the substrate 110 are located within the vertical projections of the second branch electrodes 125a on the substrate 110. In the present embodiments, the second pixel electrode 125 is above the first pixel electrode 124. Through the configuration, at the first display state (e.g., VR display mode), a capacitance between the second branch electrode 125a and the first side branch electrodes 124c is increased, thereby increasing the storing capacitance of the pixel, reducing feed-through voltage, and further reducing or avoiding the flicker phenomenon.

Herein, an extension direction of each of the first side branch electrodes 124c may be parallel with the alignment direction AD, in which the width of each of the first side branch electrodes 124c may be uniform, and therefore has a shape different from that of the second branch electrode 125a. However, the present disclosure is not limited thereto. In some embodiments, the shape of the first side branch electrodes 124c may be adjusted according to the shape of the second branch electrodes 125a.

Figure 7:
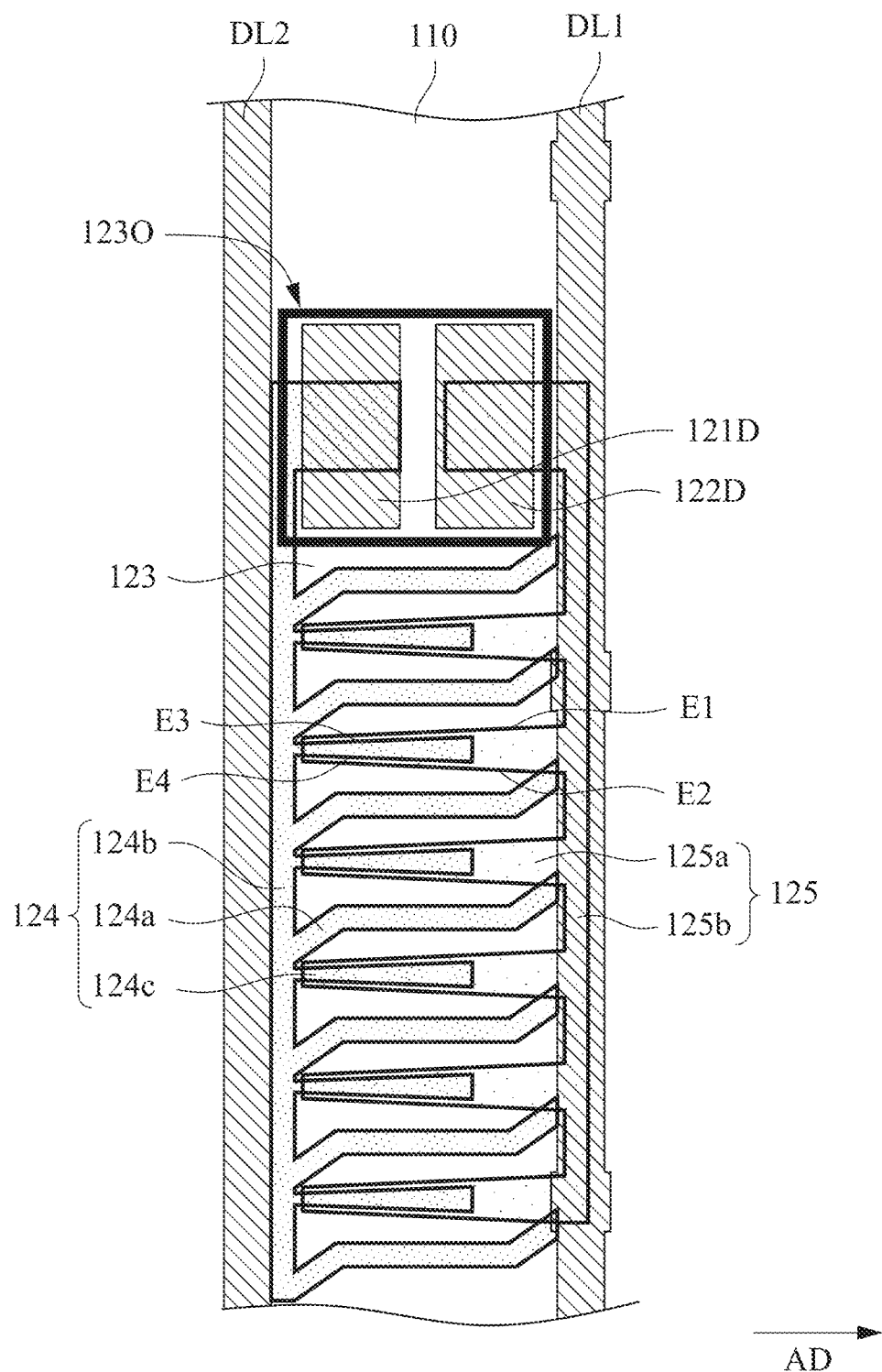
FIG. 7 is a top schematic view of a pixel structure according to another embodiment of the present disclosure.

FIG. 7 is a top schematic view of a pixel structure according to another embodiment of the present disclosure. The present embodiment is similar to the embodiment of FIG. 6A, and the difference between the present embodiment and the embodiment of FIG. 6A is that: in the present embodiment, a width of the first side branch electrodes 124c increases from a side of the first side branch electrodes 124c near the first trunk electrode 124b to another side of the first side branch electrodes 124c away from the first trunk electrode 124b. Also, a width of the second branch electrode 125a increases from a side of the second branch electrode 125a away from the second trunk electrode 125b to another side of the second branch electrode 125a near the second trunk electrode 125b. In some embodiments, the edges E3 and E4 of the first side branch electrodes 124c are parallel with the edges of the E1 and E2 of the second branch electrodes 125a. Through the configuration, the shape of the first side branch electrodes 124c matches with that of the second branch electrodes 125a. Therefore, the storing capacitance is increased, thereby further reducing or avoiding the flicker phenomenon. Other details of the present embodiments are similar to those aforementioned embodiments, and are not repeated herein.

Figure 8:
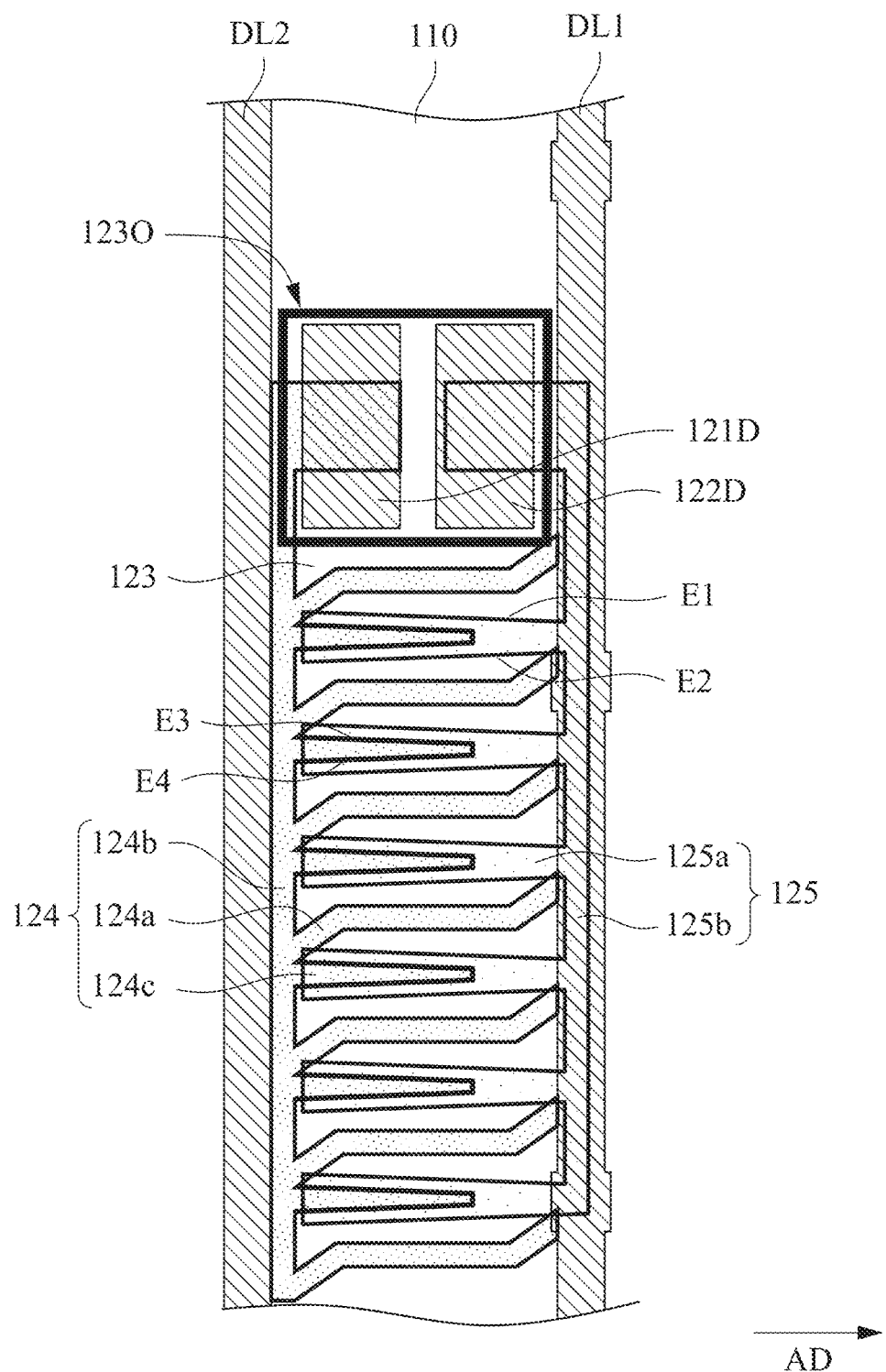
FIG. 8 is a top schematic view of a pixel structure according to another embodiment of the present disclosure.

FIG. 8 is a top schematic view of a pixel structure according to another embodiment of the present disclosure. The present embodiment is similar to the embodiment of FIG. 6A, and the difference between the present embodiment and the embodiment of FIG. 6A is that: in the present embodiment, a width of the first side branch electrodes 124c decreases from a side of the first side branch electrodes 124c near the first trunk electrode 124b to another side of the first side branch electrodes 124c away from the first trunk electrode 124b. Also, a width of the second branch electrode 125a decreases from a side of the second branch electrode 125a away from the second trunk electrode 125b to another side of the second branch electrode 125a near the second trunk electrode 125b. In some embodiments, the edges E3 and E4 of the first side branch electrodes 124c are parallel with the edges of the E1 and E2 of the second branch electrodes 125a. Through the configuration, the shape of the first side branch electrodes 124c matches with that of the second branch electrodes 125a. Other details of the present embodiments are similar to those aforementioned embodiments, and are not repeated herein.

According to some embodiments of the present disclosure, a pixel structure is provided. The pixel structure has two interlaced first and second branch electrodes, in which edges of the second branch electrodes are designed to have positive and negative angles with respect to an alignment direction. Through the configuration, at the first display state, an electric field is generated only by the second branch electrodes, such that the liquid crystals are divided into plural domains and disclination lines are formed, thereby enhancing the response rate of the pixel structure at the first display state. At the second display state, electric fields are generated by the first and second branch electrodes, thereby achieving higher brightness. In addition, some first side branch electrode are designed for increasing storing capacitance, thereby reducing feed-through voltage, and further reducing or avoiding the flicker phenomenon.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A pixel structure, comprising:
   a substrate;
   a first gate line and a second gate line over the substrate;
   a first data line and a second data line over the substrate and intersecting with the first gate line and the second gate line; and
   at least one pixel unit over the substrate, wherein the first gate line and the second gate line are on the same side of the pixel unit, and the first data line and the second data line are on opposite sides of the pixel unit, wherein the pixel unit comprises:
      a first active device and a second active device electrically connected to the first data line and respectively electrically connected to the first gate line and the second gate line;
      a common electrode electrically connected to a common voltage source;
      a first pixel electrode over the common electrode and electrically connected to the first active device; and
      a second pixel electrode over the common electrode and electrically connected to the second active device, wherein the second pixel electrode comprises a plurality of second branch electrodes, and a width of at least one of the second branch electrodes decreases from a first side of the at least one of the second branch electrodes to a second side of the at least one of the second branch electrodes.

2. The pixel structure of claim 1, further comprising:
   an alignment film over the second pixel electrode, wherein the alignment film has an alignment direction, and an extension direction of the second branch electrodes is parallel with the alignment direction.

3. The pixel structure of claim 1, further comprising:
   an alignment film over the second pixel electrode, wherein the alignment film has an alignment direction, and the at least one of the second branch electrodes has two edges having a positive angle $\theta_1$ and a negative angle $\theta_2$ with respect to the alignment direction respectively, wherein $0°<\theta_1<90°$, and $0°<\theta_2<90°$.

4. The pixel structure of claim 1, wherein the first pixel electrode comprises a first trunk electrode and a plurality of first branch electrodes connected to the first trunk electrode, and projections of the first branch electrodes on the substrate are alternately arranged with projections of the second branch electrodes on the substrate.

5. The pixel structure of claim 4, wherein the second pixel electrode is located above the first pixel electrode in a direction normal to the substrate, the first pixel electrode further comprises a plurality of the first side branch electrodes connected to the first trunk electrode, and projections of the first side branch electrodes on the substrate are within the projections of the second branch electrodes on the substrate.

6. The pixel structure of claim 5, wherein a width of at least one of the first side branch electrodes decreases in a direction, and the width of the at least one of the second branch electrodes decreases in the direction.

7. The pixel structure of claim 4, wherein at least one of the first branch electrodes comprises a first portion, and an extension direction of the first portion of the at least one of the first branch electrodes is parallel with an extension direction of the second branch electrodes.

8. The pixel structure of claim 7, further comprising:
an alignment film over the second pixel electrode, wherein the alignment film has an alignment direction, and the extension direction of the first portion of the at least one of the first branch electrodes is parallel with the alignment direction.

9. The pixel structure of claim 7, further comprising:
an alignment film over the second pixel electrode, wherein the alignment film has an alignment direction, and the at least one of the first branch electrodes further comprises a second portion connected to a side of the first portion, wherein an extension direction of the second portion has an angle $\theta_3$ with respect to the alignment direction, and $0° < \theta_3 < 90°$.

10. The pixel structure of claim 9, wherein the at least one of the second branch electrodes has a side surface having an angle $\theta_1$ with respect to the alignment direction, and a complementary angle of $\theta_3$ is greater than $\theta_1$.

11. The pixel structure of claim 4, wherein each of the first branch electrodes has a uniform width.

12. The pixel structure of claim 4, wherein an extension direction of the first trunk electrode is parallel with an extension direction of the first data line.

13. The pixel structure of claim 1, wherein the second pixel electrode is located above the first pixel electrode in a direction normal to the substrate.

14. The pixel structure of claim 1, wherein the first pixel electrode is located above the second pixel electrode in a direction normal to the substrate.

15. The pixel structure of claim 1, wherein the second pixel electrode further comprises a second trunk electrode connected to a drain electrode of the second active device, the second branch electrodes are connected to the second trunk electrode, the first side of the at least one of the second branch electrodes is proximate to the second trunk electrode, and the second side of the at least one of the second branch electrodes is located away from the second trunk electrode.

16. The pixel structure of claim 15, wherein an extension direction of the second trunk electrode is parallel with an extension direction of the first data line.

17. The pixel structure of claim 1, wherein the second pixel electrode further comprises a second trunk electrode connected to a drain electrode of the second active device, the second branch electrodes are connected to the second trunk electrode, the first side of the at least one of the second branch electrodes is located away from the second trunk electrode, and the second side of the at least one of the second branch electrodes is proximate to the second trunk electrode.

18. The pixel structure of claim 1, wherein there is a first potential difference between the first pixel electrode and the common electrode, and there is a second potential difference between the second pixel electrode and the common electrode, wherein at a first display state, the first potential difference is substantially equal to zero, and an absolute value of the second potential difference is substantially greater than zero.

19. The pixel structure of claim 18, wherein at the first display state, the pixel unit has a transmission area and a non-transmission area, and the non-transmission area overlaps with the second pixel electrode in a direction normal to the substrate.

20. The pixel structure of claim 18, wherein at a second display state, an absolute value of the first potential difference is substantially greater than zero, and an absolute value of the second potential difference is substantially greater than zero.

* * * * *